Fig. 1.

April 2, 1940.   W. R. BULLARD   2,196,138
NETWORK PROTECTOR RELAY
Filed Dec. 4, 1937   4 Sheets-Sheet 3

Patented Apr. 2, 1940

2,196,138

UNITED STATES PATENT OFFICE 2,196,138

NETWORK PROTECTOR RELAY

William R. Bullard, Port Washington, N. Y., assignor to P & B Electric Co., Wakefield, Mass., a corporation of Massachusetts Application December 4, 1937, Serial No. 178,127

16 Claims. (Cl. 175—294)

This application is a continuation-in-part of my co-pending application Serial No. 707,313, filed January 19, 1934, for "Network protector relay" which has become abandoned. The invention relates to mechanism for protecting an electrically charged network or working circuit which is supplied with power through a plurality of feeder circuits from one or more sources of electrical energy. Where several feeder circuits are employed to supply electrical energy to a network, it sometimes happens that, if a short circuit or other trouble occurs in one of the feeder circuits, the trouble is augmented by energy supplied from the other feeder circuits through the network itself. The present invention has to do with mechanism for automatically cutting off any feeder circuit from the network in response to a reverse flow of power of predetermined magnitude from the network to the feeder, and for reconnecting the feeder circuit under certain conditions hereinafter described. The apparatus hereinafter described is characterized by comparative simplicity, reliability and high speed of operation even when the voltage in the feeder is low, economy of installation and maintenance, and lack of undesirable sensitiveness to small reversals of energy flow. According to the invention, control apparatus is supplied for automatically operating a circuit breaker between a feeder circuit and a network or working circuit, this control apparatus being capable of use either in a direct-current system or in a single phase or polyphase alternating-current system. In the embodiments of the invention illustrated on the accompanying drawings, an alternating current system is illustrated, but it will be evident to one skilled in the art that the control mechanism with slight modifications, will function equally well in a direct-current system. According to one embodiment of the invention herein illustrated, the control apparatus is connected to the feeder circuit only, so that it is entirely disconnected from the network when the circuit breaker controlled by the control mechanism is open. Thus, when the feeder circuit is dead, the control apparatus is also dead and inoperative. If, however, the feeder circuit remains alive after the circuit breaker has opened, the control mechanism acts after a predetermined interval to close the circuit breaker. If the voltage in the feeder circuit is still such as to result in excessive reverse power flow, the breaker immediately opens again for another predetermined time interval. Otherwise, it remains closed. Thus, apparatus embodying the invention protects the system from dangerous conditions, but it is not subject to undesired operation in response to every little reversal of power flow in a feeder. For example, in a network of considerable extent, conditions sometimes occur under which a heavy concentrated load will cause a moderate flow of reverse energy through one or more of the transformers. Also the operation of elevator motors which employ regenerative braking may produce the same result. Under such circumstances, the opening of the circuit breakers in these transformer circuits is undesirable.

In the present invention, sensitivity is avoided by providing a stationary armature normally engaged by the core of a movable potential coil, movement of which away from the armature is necessary for the opening of the breaker. The potential coil is normally connected across the feeders and its core is magnetically held to the armature by a force proportional to the square of the voltage on the coil, whereas the reverse-power force acting on the coil to move it to breaker-opening position is directly proportional to the impressed voltage. Hence, with normal voltage in the feeder, the potential coil core may be strongly held to the stationary armature, but, when operation of the protector relay is desired, as when there is a short circuit in the supply line, the resultant low voltage weakens the holding force of the stationary armature far more than the operating force resulting from reverse power, so that the stationary armature is most effective under normal conditions, but offers little hindrance to operation of the protective relay under conditions when operation is desired.

When circuit breakers are opened by protective relays known in the prior art, they remain open until the voltage on the supply side of the breaker is higher than that on the load or network side. According to the present invention, the relay is preferably made in such a manner as to be insensitive to moderate reverse power flow but to operate in response to excessive reverse flow such as might result from a short circuit. After the breaker is opened, it is automatically closed after a predetermined interval, if the feeder circuit remains alive during that interval, and remains closed if within such interval the cause of the excess reverse flow abates. If the feeder circuit is deenergized during said interval, the breaker will not close until the feeder circuit is re-energized, but will then close instantly.

For satisfactory operation of a net-work protecting apparatus under such abnormal conditions as are apt to exist when operation of the protector is needed and desired, the control mechanism of the apparatus should be capable of operating effectively under comparatively low voltage since a short circuit in the supply circuit near the protector apparatus will obviously result in low voltage conditions in the apparatus. Furthermore, in the case of alternating current systems, abnormal conditions, such as a short circuit in the supply circuit, usually result in a radical alteration of the phase relation of the voltage and current in the feeder due to the transformer through which the feeder is connected to the supply circuit.

In network protector relays heretofore in use, it has been customary to employ a reverse-power control mechanism of the induction watt-hour meter type in which the interaction of magnetic fluxes produced by potential and current coils on a rotatable metal disk cause the disk to rotate. For producing maximum torque in the disk, these fluxes should be in quadrature. This condition is approximately obtained when such an instrument is connected into a circuit with a high power factor, that is, in which the current is nearly in step with the voltage since the high impedance of the potential coil causes almost a 90° lag in its flux relative to the current coil which has very little impedance. Thus, a control instrument of the watt-hour meter type is apt to work well when normal phase relations between voltage and current exist in the feeder; but, when a short circuit occurs in the supply circuit, conditions in the feeder are usually abnormal so that the voltage is liable not only to be very low, but also to be widely out of step with the current. The combination of low voltage and low power factor renders the action of the control mechanism weak and uncertain so that it cannot be relied upon, especially when most needed. In polyphase systems, this defect can be remedied to some extent by connecting the current and potential coils in different phases, but this cannot be done in single-phase circuits. According to the present invention, a control mechanism is provided including stationary and movable coil cores, the fluxes of which act on each other directly and exert maximum force on the movable cores when the fluxes are in step. The stationary cores are energized by current coils and the movable cores by potential coils. When a control mechanism of this kind is connected into a single-phase feeder or corresponding potential and current coils of a polyphase mechanism are connected into the same phases, low power-factor conditions in the feeder improve the effectiveness of the mechanism and largely offset the weakening effect of low voltage in the feeder as would result from a nearby short circuit in the supply circuit. This makes for rapid positive operation of the control mechanism particularly at times when rapid positive operation is particularly needed.

Where the control mechanism is designed for polyphase alternating currents, means is provided for preventing the closing of the breaker if the phase impulses in the primary of the feeder circuit are not in the same sequence as the phase impulses in the net work.

For a more complete understanding of the invention, reference may be had to the description of embodiments thereof which follows, and to the illustration of these embodiments on the drawings of which

Figure 1:
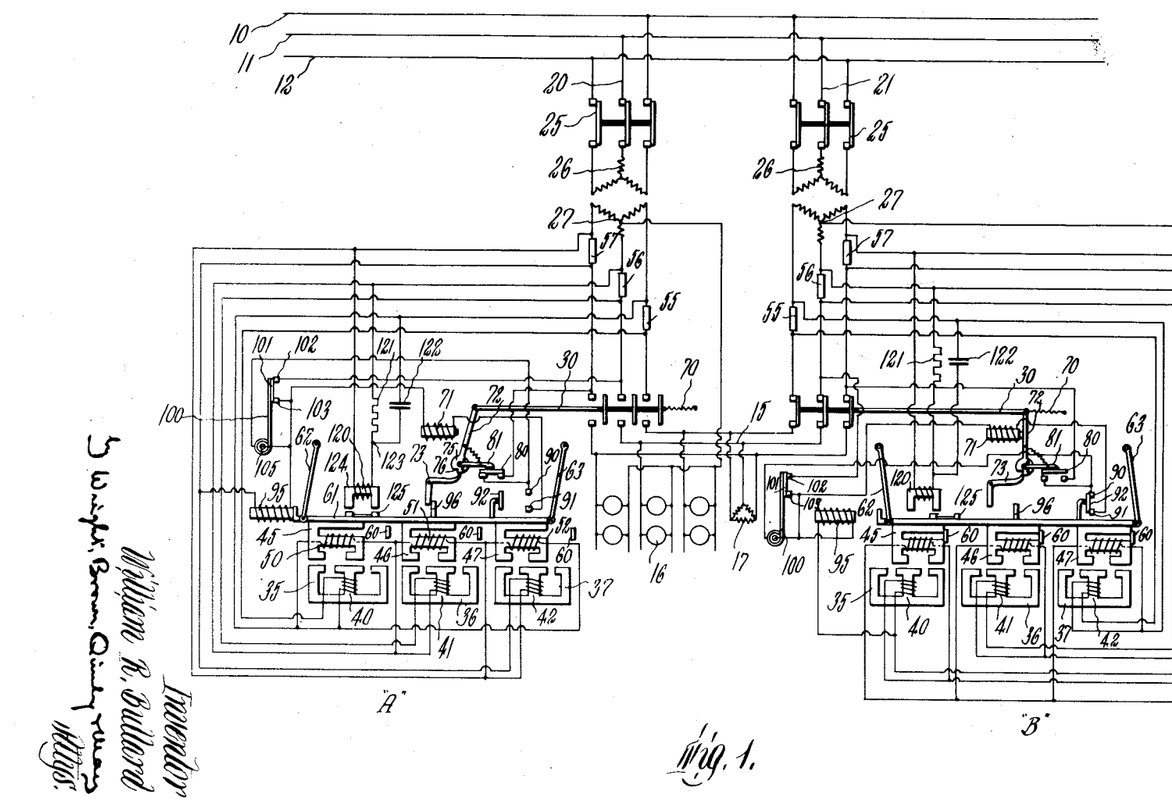
Figure 1 is a wiring diagram of a network supplied by two feeders, each equipped with control mechanism embodying the invention.

As shown in Figure 1, the invention may be embodied in a three-phase alternating-current power system including high-tension power lines 10, 11, 12, from which power is supplied through a plurality of feeder circuits (two such feeder circuits being shown) to a working circuit indicated at 15, this circuit including loads of any kinds such as are found in working circuits, as, for example, lamps 16 or motors 17. The two feeder circuits illustrated in Figure 1 are designated respectively as 20 and 21, each of these circuits including a primary circuit breaker 25 between the high tension lines and the primary coils 26 of a step-down transformer. The secondary coils of each of these transformers are indicated by the character 27. Between each transformer secondary 27 and the net work 15 is a secondary circuit breaker 30 which is automatically operated by control mechanism hereinafter described. The two control mechanisms illustrated in Figure 1 are identical in structure, although the movable parts are shown in different positions of operation, but the mechanisms are differently connected to their respective feeders as hereinafter described. As the corresponding parts in the two mechanisms are the same, such parts are indicated by similar reference characters. For convenient reference, the control mechanism in the left-hand portion of Figure 1 is designated as A, that in the right-hand portion of Figure 1 being designated as B.

As hereinbefore stated, the particular embodiment of the invention illustrated in Figure 1 is adapted for operation with three-phase alternating current. It is evident, however, that the transformers 26, 27, can be omitted for direct-current systems, and that obvious modifications of the control apparatus can be made for use with direct-current systems or single-phase alternating-current systems.

As shown, the mechanism for controlling the circuit breaker 30 comprises a series of fixed electromagnetic cores 35, 36, 37, these cores having current coils 40, 41, 42, respectively, wound thereon. These current coils have relatively few turns of wire, and hence have low impedance. Each of these cores is shaped somewhat like the letter W, the coils being wound on the central leg as shown. Above the fixed electromagnets 35, 36, 37, are movable electromagnets 45, 46, 47, having thereon potential coils 50, 51, 52, respectively, these coils having high impedance. The current coil 40 is connected to opposite sides of a reactive shunt 55 in one of the wires of the secondary feeder circuit. In like manner the current coils 41 and 42 are connected around reactive shunts 56 and 57, respectively, in the other wires of the secondary feeder circuit.

Figure 2:
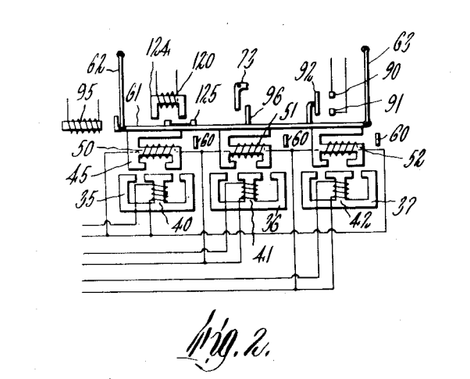
Figure 2 is a diagrammatic view of one of the control mechanisms shown in Figure 1, the relay member being shown in a different position of operation.

A fixed armature 60 is provided for each of the potential electromagnets 45, 46, 47, so that, when any of the potential coils 50, 51, 52 is energized by voltage in the feeder circuit, its core is attracted to the corresponding fixed armature 60. As hereinafter explained, it is desirable that the electromagnets 45, 46, 47 be movable from their intermediate position, as indicated in Figure 2, to various positions of operation, two such positions being illustrated respectively in Diagram A and Diagram B. To this end, these magnets may be attached to a horizontal bar 61 so as to be movable therewith. This bar may be suitably supported for longitudinal movement by any suitable means such as a pair of leaf springs, or, as shown, a pair of parallel links 62, 63, by which the bar 61 is swingably supported. When no current is flowing in the potential coils 50, 51, 52 or in the currents coils 40, 41, 42, the potential magnets with their supporting bar assume an intermediate position such as is illustrated in Figure 2, under the influence of gravity. It is further evident that, if the potential coils alone or the current coils alone are energized, the attraction between the cores of the potential magnets and those of the current-coil magnets will be substantially vertical. The windings of the current coils and potential coils, however, are such that, if both are energized by energy passing through the feeder circuit in normal direction, that is, from the transformer to the network, then the magnetic poles induced in the cores 35, 36, 37 and 45, 46, 47 will be such as to move the relay member 61 with the movable magnets toward the right, that is, to the position illustrated in Diagram B. This movement is aided also by the attraction of the armatures 60, the potential coils 50, 51, 52 being energized. If, however, the potential coils and current coils are energized by reverse currents in the feeder circuit, that is, when power is flowing from the network toward the transformer, the polarity of the cores will be such as to tend to move the relay member 61 toward the left. Since the potential coils are normally in contact with their armatures 60, movement of the member 61 toward the left must be made by forces of sufficient magnitude to overcome the magnetic attraction between the cores and their armatures. Since this force is proportional to the square of the impressed voltage, the apparatus may be constructed so that considerable attraction is exercised under conditions of normal voltage in the feeder, the attractive force being rapidly reduced by a drop in the voltage such as may be expected under conditions, such as a short circuit in the supply line, when operation of the relay is desirable.

On the other hand, the operating forces acting on the member 61 as a result of reverse power in the feeder vary as the first power of the voltage. Hence these operating forces are not weakened by a voltage drop to anywhere near the extent that the attraction of the armature 60 is weakened. Hence the armatures 60 are comparatively effective to prevent operation of the relay when voltage is approximately normal, and are ineffective when operation of the relay is desired. The relay is thus insensitive to small reversals of power, but acts quickly in response to a large reversal of power.

Figure 6:
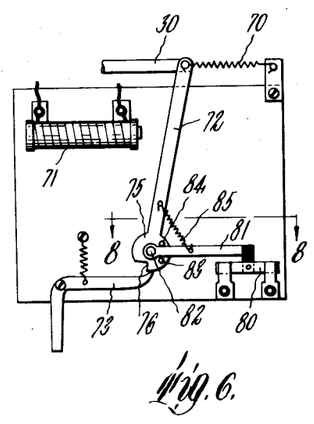
Figure 6 is a diagrammatic elevation of a portion of the mechanism shown in Figure 1.
Figure 7:
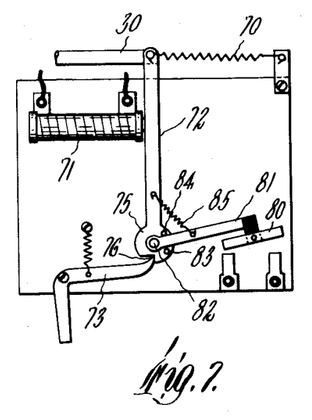
Figure 7 is an elevation of the same, showing the parts in a different position of operation.
Figure 8:
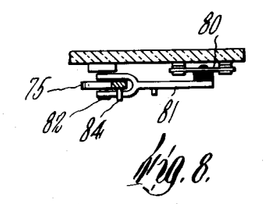
Figure 8 is a section on the line 8—8 of Figure 6.

The circuit breaker 30 is constantly pulled towards its open position as by a spring 70. The breaker is closed against the pull of the spring 70 by a suitable electromagnet 71 acting on an armature 72 which is attached to the breaker 30. A suitable latch member 73 is provided to hold the breaker 30 in its closed position after the magnet 71 is de-energized. Any suitable mechanism for this purpose may be employed. As shown, the armature 72 projects radially from a rotating disk 75 which has in the edge thereof a notch 76. The end of the latch 73 is adapted to engage in the notch 76 so as to hold the breaker 30 in its closed position when it has been moved into such position by energization of the electromagnet 71. In series with the electromagnet 71 is a switch 80 which is adapted to open as soon as the circuit breaker 30 has reached its closed position so as to open the circuit through the magnet 71. Mechanism suitable for this purpose is illustrated in Figures 6 and 7, and may include an arm 81 having one end pivotally mounted as at 82 coaxially wtih the disk 75. The other end of the arm 81 is attached to the switch member 80. Mounted on the face of the disk 75 on either side of the arm 81 are a pair of pins 83 and 84. These pins are so positioned that, when the armature 72 is swung to the right under action of the spring 70 of the circuit breaker, the pin 84 presses the switch member 80 into closed switch position. When the armature 72 is swung to the left by the magnet 71, the switch member 80 is retained by frictional engagement with the switch contacts until the arm 72 has nearly reached the position shown in Figure 7. During the final portion of the movement of the arm 72 to the left, the pin 83 engages the arm 81 and moves the switch member 80 clear of its contacts. A light spring 85 is provided between the arms 72 and 81, so that, when the switch member 80 is released from frictional engagement with its contact elements, it is quickly swung clear by the spring 85. This breaks the energizing circuit through the magnet 71, and by this time the nose of the latch member 73 has entered the notch 76 in the disk 75 so that the circuit breaker 30 is retained mechanically in its closed position until the latch 73 is tripped. In series with the magnet 71 and the switch 80 is a second switch which may consist of a pair of contact elements 90, 91, which are adapted to be connected by a switch member 92, this member being mounted on the relay member 61. As is evident from Figure 1, movement of the relay member 61 toward the right closes the switch 92, so that, if the switch 80 is already closed and the feeder circuit is energized, the magnet 71 will be energized to close the circuit breaker 30, whereupon the switch 80 opens, as hereinbefore described, to de-energize the magnet 71.

A holding coil 95 is connected across two of the feeder wires so that it is normally energized whenever the feeder wires are energized. This coil may be arranged to have a comparatively small magnetic flux, insufficient to pull the relay member 61 from its intermediate position, but sufficient to hold the relay member 61 in its breaker-closing position shown in Diagram A whenever moved thereto, as long as the holding coil remains energized. Thus, if after the opening of a circuit breaker 30, the transformer 26, 27 remains energized, the holding coil 95 will also remain energized for the time being, and the relay member 61 will be retained in the position shown in Diagram A. Mounted on the relay member 61 is a lug 96 which is adapted to trip the latch 73 when the relay member moves toward the left, so as to release the circuit breaker 30 and to permit it to be opened by the spring 70. Thus, when the circuit breaker is opened by movement of the relay member 61 towards the left, it cannot be closed until the relay member is released by the holding coil 95 and is moved to its extreme right position, as shown in Diagram B, wherein the switch 92 is closed. If desired, the coil 95 may be wound so as to have a magnetic flux sufficiently strong to pull the member 61 over from its intermediate position.

Figure 3:
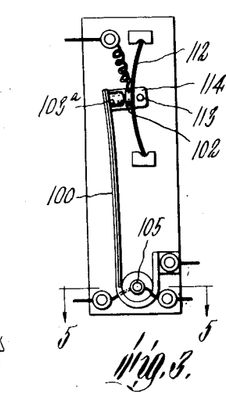
Figure 3 is an elevation of a thermostatic switch which may be employed as a part of the control mechanism.
Figure 4:
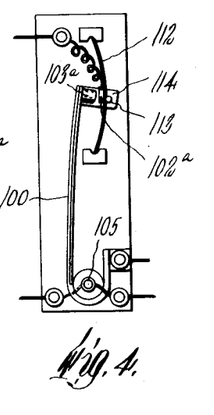
Figure 4 is an elevation of the switch shown in Figure 3, the parts being in a different position of operation.
Figure 5:
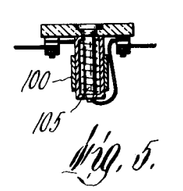
Figure 5 is a section on the line 5—5 of Figure 3.

For the control of the magnet 71 and the holding coil 95, a thermostatic switch 100 of any suitable design is provided. As shown, this switch is provided with a switch member 101 adapted to move in and out of contact with a pair of contact elements 102, 103. A heater coil 105 is provided to heat the thermostatic element 100. Any other kind of suitable heating unit such as a resistance rod of suitable composition will also serve this purpose. When the coil 105 has been energized for a predetermined period of time, the thermostatic element 100 becomes sufficiently heated to move the switch member 101 away from the contacts 102 and 103 so as to open the switch. In order to obtain a quick make or break, the switch may be constructed as shown in Figures 3 and 4, one of the contact elements 103a being mounted on the thermostatic element 100, the other element 102a being mounted on a spring 112 which is adapted to snap quickly from the position shown in Figure 3 to that shown in Figure 4, and back again, its movement being limited by a peg 113 mounted on an arm 114 attached to the element 100. In this form of switch the thermostatic element 100 carries current. As indicated in Figure 1, the thermostatic switch is included in three circuits, as follows: the circuit through the magnet 71, the circuit through the holding coil 95, and the circuit through the heating coil 105. The heating coil 105 is also in series with the switch 80. Thus, whenever the switch 80 is closed and there is energy in the secondary circuit, the heating coil 105 is energized so that after a predetermined interval the thermostatic switch is opened. This breaks the circuit through the magnet 71, the circuit through the holding device 95, and the circuit through the eating coil 105. The heating coil 105 thereupon begins to cool and the thermostatic element 100 begins to resume its normal shape so as to close the thermostatic switch. Meanwhile the de-energization of the holding magnet 95 releases the relay member 61. If the secondary circuit is dead, this relay member swings under gravitational force to the central position shown in Figure 2. If there is energy in the secondary feeder circuit, the relay member 61 will be swung toward the right so as to close the switch 92. This, however, will not at once result in the energization of the magnet 71 since its circuit is open at the thermostatic switch. In case the secondary feeder circuit remains energized until the thermostatic element 100 has closed the thermostatic switch, the breaker 30 will then be closed by the magnet 71. If the potential and phase conditions in the feeder circuit and load circuit are correct, the breaker circuit 30 will remain closed. If, however, the voltage or phase relation between the feeder circuit and the working circuit is incorrect, the relay member 61 will be swung quickly to the left, causing the breaker circuit 30 to open again. This results in the energization of the heating coil 105 again so that the cycle of operation hereinbefore described is repeated until abnormal conditions in the feed circuit are remedied.

It is desirable in a network protector to prevent the closing of the breaker between the feeder circuit and the load circuit unless the voltage in each circuit is in phase with that of the other. On the other hand, it is desirable to cut off the feeder circuit completely from the load circuit by the opening of the breaker 30. In order to provide partial protection against the closing of the breaker 30 when the voltages in the two circuits are out of phase, I connect across the shunt circuits which lead to the coils 40, 41, 42, a reactance coil 120, a non-inductive resistance 121, and a condenser 122, these three elements being star connected from a common point 123 to the three secondary leads. Under some conditions a reactance coil and two non-inductive resistors, or a reactance coil and two condensers will serve the purpose of the combination here illustrated and described. Also, if the circuits to be protected are other than the three-phase case illustrated, particular combinations to protect the particular circuit involved can readily be devised by those skilled in the art, using the principle herein disclosed. The reactance coil 120 is provided with a core 124 which may be conveniently shaped like a horseshoe magnet so as to be adapted to attract an armature 125 on the relay member 61 when any considerable current flows through the coil 120. As shown in Figure 2, the armature 125 is somewhat offset toward the right with respect to the poles of the magnet core 124 when the relay member 61 is in its intermediate position. The armature 125 is preferably directly opposite the magnet core 124 when the relay member 61 is in its position to the left, as shown in Diagram A in Figure 1. The reactance of the coil 120 and the capacity of the condenser 122 are selected in a manner known in the art, so that, by reason of the lag of current in the coil, the lead of current in the condenser, and the lack of lag or lead of current in the resistor, the voltage in the star connection is so balanced that very little current flows through the coil 120 when the phase impulses in the secondary feeder circuit follow each other in normal sequence. Thus, under such conditions, the magnet 124 is only slightly energized, this being insufficient to affect the movement of the relay member 61. If, however, the phase impulses in the feeder circuit occur in reverse order, then the coil 120 is strongly energized so that the relay member 61 is held thereby in its left-hand position as long as the transformer secondary is energized with reversed phase rotation. This device affords sufficient but not complete protection against possible closing of the breaker 30 when phase conditions in the feeder and load circuits are not the same, as is evident from the following. If the breaker 25 has been opened to permit repairs in the power lines leading from the breaker to the transformer primary 26, it sometimes happens that the repair man connects together the wrong ends when reconnecting broken or cut wires. If all three wires have been cut, there are six different ways in which they can be reconnected, first, the correct way in which each end is reconnected to the end to which it was previously connected, or, three ways in which one wire is connected properly, the other two being crossed, or, two ways in which all of the wire ends are connected to ends other than those to which they were originally connected. Where one of the three wires is properly reconnected, the other two being crossed, the sequence of phase impulses delivered to the transformer will be reversed so that, if the breaker 25 is closed after the wires have thus been reconnected, the magnet 120 will be strongly energized to prevent movement of the relay member 61 toward the right. In the event that all three of the wire ends are wrongly connected, the resulting sequence of phase impulses will be correct but the alterations will be out of step with those in the load circuit, there being either a lead or a lag of 120°. Since in such case the sequence of phase impulses in the feeder is correct, the coil 120 will not be strongly energized so that it will not prevent the closing of the breaker 30. This may thus result in a closing of the breaker 30 when the feeder circuit is out of phase with the load circuit. In such case, the breaker 30 will at once be automatically opened again. Such closing of the breaker with incorrect phase relations between the feeder circuit and the load circuit may occur only in the improbable event that all three wires in the feeder primary circuit are connected up incorrectly after they have been broken or cut. Hence the magnet 120 gives all the protection that is practically necessary against closing of the breaker 30 when the feeder circuit is out of phase with the load circuit, this protection being obtained without bridging the open contacts in the breaker 30.

In operation, if a short circuit or other abnormal condition in the system causes an excessive reverse current to flow through one of the feeder circuits, the coils 50, 51, 52 react with the coils 40, 41, 42, in such a way as to move the relay member 61 toward the left. This trips the latch 73 and permits the breaker 30 to open, disconnecting completely the feeder circuit from the load circuit. If there is no energy in the transformer secondary 27, the entire secondary feeder circuit is dead, together with all of the apparatus electrically connected thereto. Since this also includes the holding coil 95, the relay member 61 is released so that it assumes its intermediate position as illustrated in Figure 2. The opening of the circuit breaker 30 results in the closing of the switch 80 so that under such circumstances the circuit containing the magnet 71 is ready to be closed by the closing of the switch 92. If the transformer secondary 27 is now energized with phase impulses in normal sequence, the relay coils 50, 51, 52 are energized so that the attraction of the cores 45, 46, 47 toward the respective armatures 60 moves the relay member 61 toward the right, as shown in Diagram B. This closes the switch 92 so that the magnet 71 is energized and closes the breaker 30. The closing movement of the breaker 30 opens the switch 80 and thus de-energizes the magnet 71 as soon as the latch 73 has engaged in the notch 76 to hold the breaker 30 in its closed position.

If, after an opening of a circuit breaker 30 the transformer secondary continues to be energized, the holding coil 95 will retain the relay 61 in its left-hand position. The heating coil 105 is energized at the same time and causes the thermostatic element 100 to open the switch 101 after a predetermined interval. This de-energizes the holding coil 95, releasing the relay member 61, de-energizes the heating coil 105 which thereupon starts to cool, and provides an opening in the circuit through the magnet 71 so that the breaker 30 cannot be automatically closed until a sufficient interval of time has elapsed to enable the thermostatic element 100 to return to normal position so as to close the switch 101. If by this time normal conditions have been restored in the feeder circuit, the breaker 30 closes and remains closed. If, however, the condition which resulted in the opening of the breaker 30 has not been corrected, the breaker 30 will close momentarily but will be at once automatically opened again for another interval of operation of the thermostatic element. Thus a suitable inoperative interval is provided in which a temporary variation in primary voltage, such as might result in the opening of the breaker 30, can correct itself so that the breaker 30 will remain closed when it is reclosed. This interval can be made as large as desired by adjusting the characteristics of the thermostatic switch. This arrangement will result in the avoidance of "pumping", that is, rapid and repeated reclosing and reopening of the automatic breaker such as are liable to occur in ordinary service conditions in a network supplied through multiple feeders.

Figures 11, 12, 13:
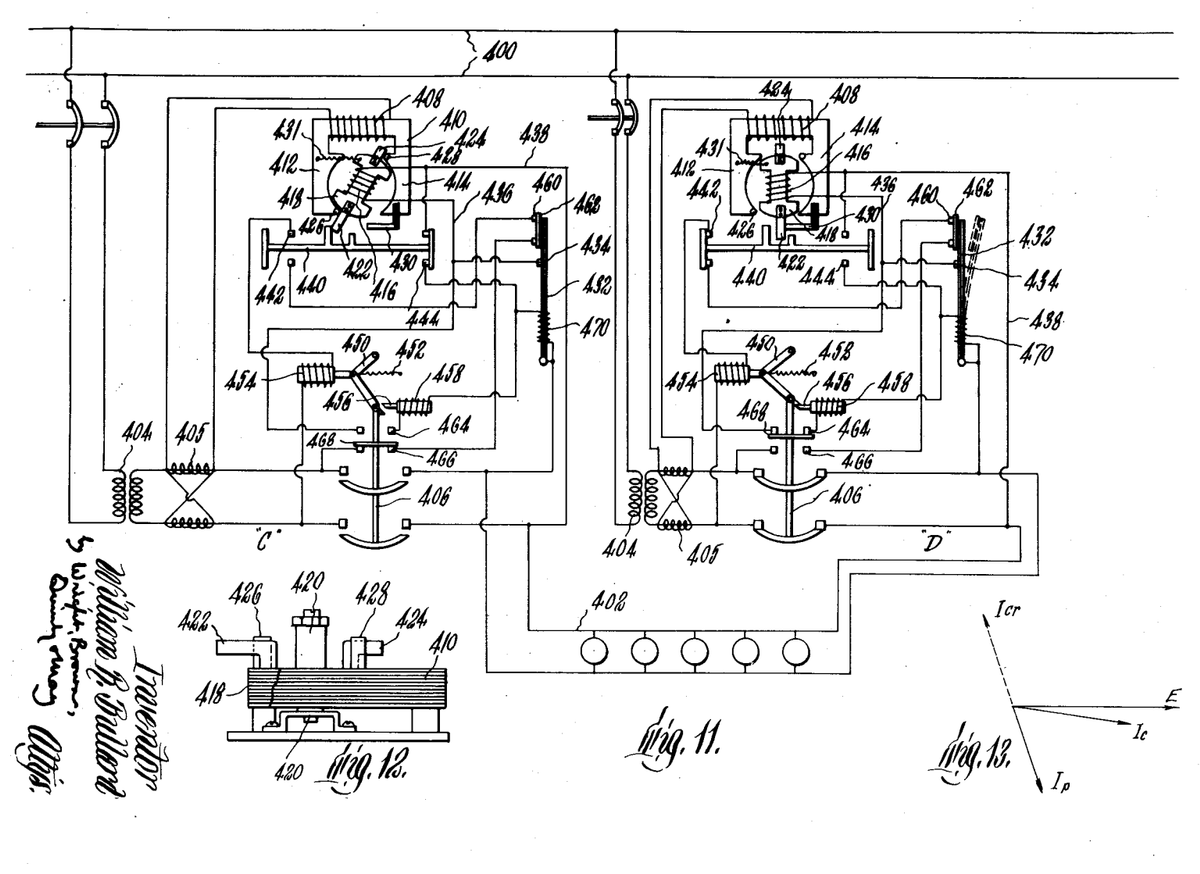
Figure 11 is a diagrammatic view of another form of the invention.
Figure 12 is an elevational view of a portion of the apparatus shown in Figure 11, a portion being broken away.
Figure 13 is a vector diagram illustrating the phase relations obtaining in the apparatus shown in Figures 1 and 11.

The potential coils, as illustrated in Figure 1, can be connected to polyphase feeders in different ways. In Diagram A the potential coils are shown as connected between pairs of phases. In diagram B the potential coils are each connected into the same phase as their corresponding current coils, this being the way in which the potential and current coils would necessarily be connected into a single phase circuit. This mode of connection is the preferred one as it renders the entire apparatus more effective when acting under such conditions as usually occur to cause a strong reverse flow of power in the feeder. The operation of the relay apparatus involves a certain amount of mechanical work, in the present instance the moving of the member 61 and the tripping of the latch 73. The electromagnetic force available for this operation will depend on the voltage impressed on the potential coils and the phase relation existing between the currents in each potential coil and its corresponding current coil. If the conditions which cause a strong reverse flow of power in the feeder are such as to result in low voltage, then the phase relation between the potential and current coils must be nearly right if the operation of the relay is to be positive and dependable. For example, a short circuit may occur in the supply circuit, causing a heavy reverse flow of power from the network to the supply circuit. This results in low voltage in the feeder, and, due to the impedance of the transformer 26, 27, a large lag of current behind the voltage. This lag is largely offset by phase difference in the relay apparatus resulting from the high impedance of the potential coils and the negligible impedance of the current coils. The currents in these coils are thus approximately in the same or opposite phase with each other, thus producing maximum mechanical force for the voltage available at the time. Typical phase relations of currents may be illustrated by a vector diagram such as is shown in Figure 13. The vector E represents the voltage in one phase of the feeder. The vector Ic represents the current in the corresponding current coil, slightly lagging the voltage. The current in the potential coil is indicated at Ip, lagging the voltage by a large angle owing to its reactance. A short circuit in the supply line results in a large lag of the line current behind its voltage, owing to the reactance of the transformer. The direction of the line current is reversed, since power is flowing from the network to the supply line, the reversed current being represented by the dotted line Icr the phase of which is approximately opposite to that of the current Ip in the potential coil. This phase relation results in quick and positive operation of the relay even under adverse voltage conditions.

Figure 9:
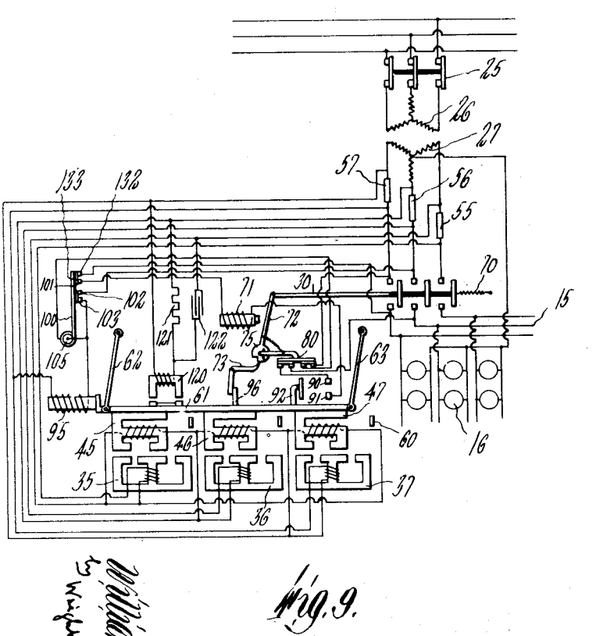
Figure 9 is a wiring diagram of a modified form of the invention.

Figure 9 shows a modified embodiment of the invention differing from that in Figure 1 by the connection of the breaker-actuating coil 71 to the load circuit rather than to the supply circuit. In such case, the energy for closing the breaker 30 is derived from the network, so that, if the network is dead, voltage in the supply will not be effective to close the breaker. As in the system shown in Figure 1, opening of the breaker 30 completely disconnects the supply circuit from the load circuit. To keep the two circuits entirely separate when the breaker is open, the poles of the switch 80 are duplicated, one pair being in the energizing circuit for the magnet 71, the other pair being in the circuit for energizing the magnet 95 and the heater coil 105. The energizing circuit for the magnet 71 also includes the switch poles 90, 91, and a pair of switch poles 132, 133, the latter being controlled by the thermostatic switch 101. Thus the manner of operation of the apparatus is precisely the same as that of the apparatus shown in Figure 1 except that the energy for closing the breaker 30 is supplied directly from the network.

Figure 10:
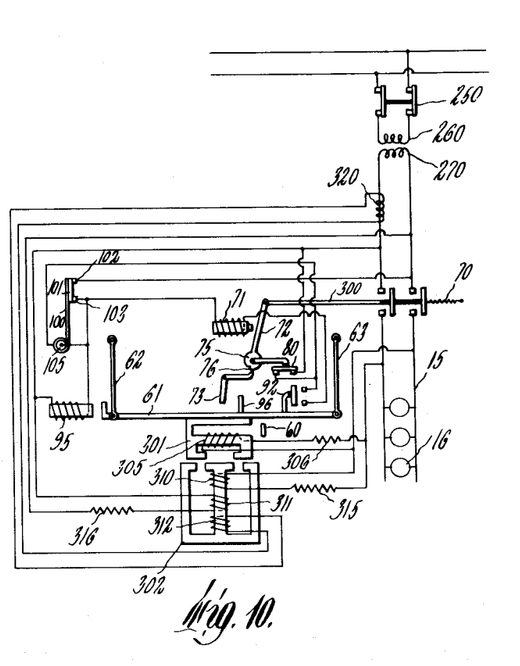
Figure 10 is a wiring diagram of another modified form of the invention.

Figure 10 illustrates another modified form of the invention as applied to a two-wire power system. The supply circuit includes a transformer 260, 270, and is connected to the load circuit or network 15 by an automatically operated circuit-breaker 300. The operating mechanism may include many parts similar to those shown in Figure 1. An electromagnet 301 is carried by the member 61 to cooperate with a fixed electromagnet 302 having three legs as shown, and with a fixed armature 60. It is evident that, in the case of polyphase circuits, an appropriate number of electromagnets 301 and 302 would be employed. As shown, the magnet 301 is excited by a coil 305 which may be connected in series with a suitable resistor 306 across the load wires. The central leg of the magnet core 302 is provided with three coils 310, 311, 312. The coil 310 is connected to the load circuit through a resistor 315. The coil 311 is connected to the supply circuit through a resistor 316. The coil 312 is a current coil connected to a current transformer 320 in the supply circuit. The two coils 310 and 311 have mutually opposing fluxes.

The magnet 301 is responsive to the resultant flux in the magnet core 302 produced by the combined action of the three coils 310, 311, 312. The characteristics of the coils 310, 311, 312 and of the resistors 315, 316 may be chosen according to the desired manner of operation of the apparatus. For example, the coil 310 may be similar to the coil 311, and the resistor 315 may have slightly greater resistance than the resistor 316. In such case, with the supply voltage substantially equal to the network voltage, the flux of the coil 311 will slightly overpower that of coil 310, leaving the flux of the current coil 312 as the dominant flux in the magnet core 302. The current coil windings are arranged so that power flow toward the network tends to move the magnet 301 toward the right, the reverse flow from the network tends to move the magnet 301 toward the left so as to open the breaker 300, that is, the flux of the coil 310 tends to move the member 61 toward the left, while the flux of the coil 311 tends to move the member 61 to the right. If the breaker is open, there will be no flux from the current coil 312, so that, if the voltage in the supply circuit is nearly equal to or greater than that in the load circuit, the member 61 will be moved to the right to close the breaker, this movement being aided by the attraction between the magnet 305 and the fixed armature 60. The movement of the member 61 to the right, however, takes place only if the supply circuit voltage is in phase with the network voltage. If a cross-phase condition exists in the supply voltage, the flux of the coil 311 will augment that of the coil 310 so that the member 61 will be held in its position to the left, thus preventing the closing of the breaker 300 as long as the cross-phase condition exists.

A modified form of network protector relay apparatus is diagrammatically illustrated in Figure 11, the relay device itself being shown in elevation in Figure 12. This apparatus is characterized by a stationary current coil and a movable potential coil, the cores of these coils being arranged to interact magnetically to cause the potential coil to move in one direction or the other according to the direction of power flow in the feeder. The relay is shown in duplicate, connected respectively to two feeders between a single phase supply circuit 400 and a network 402. The working parts of these relays are shown in different positions and the relays are for convenience indicated by the characters "C" and "D", reference characters being the same for corresponding parts in the two relays as the structures are identical.

Each feeder shown in Figure 11 comprises a step-down transformer 404, a circuit breaker 406, and suitable connecting wires. Connected to each feeder is a current transformer or shunt 405 from which current is taken to energize a current coil 408 having a core 410. This core is preferably U-shaped in the fashion of the field core of an ordinary direct-current motor, the pole portions 412 and 414 of the core being shaped to accommodate a rotor between them with minimum air gaps between. The rotor comprises a potential coil 416 and its core 418, and is rotatably mounted between the poles 412 and 414 in suitable bearings 420, as illustrated in Figure 12. The core 418 is in the form of a cylinder with recesses cut in the opposite sides thereof to accommodate the coil 416. As indicated on the drawing, the sides of the core are preferably further cut away so that, when the rotor is in the position shown in Diagram D, there is little or no overlap between the cylindrical faces of the pole portions of the rotor and the concave cylindrical surface portions of the core 418. This is to avoid any retarding effect which might arise from induced magnetic attraction between portions of the cores 414 and 418 separated by only a small air-gap. The cores 418 and 418 are preferably laminated in the usual manner and are made of soft iron or other suitable magnetic material. The rotor including the potential coil 418 is symmetrical with respect to its axis of rotation and the poles of the core 418 are equidistant from the corresponding poles of the core 410 when the rotor is in the position shown in Diagram D. Considering for the moment this arrangement of coils and cores per se, it is evident that if either coil should be energized alone, the core 410 being in the normal position shown in Diagram D, the magnetic forces acting between the cores would be balanced and no resultant torque would be exerted on the rotor. This balance of forces, however, would not be stable for, if the rotor should be given a slight push to move it from its balanced normal position, there would then be an unbalance of magnetic forces acting between the cores which would tend to rotate the rotor to a position 90° from the balanced position shown in Diagram D. So, too, if the current coil 408 should be strongly energized, a slight energization of the potential coil 416, sufficient to start rotation of the rotor, would result in an unbalance of magnetic forces due to the coil 408 alone which would strongly rotate the rotor regardless of the weakness of the energization of the coil 416.

Projecting radially from the rotor are a pair of iron arms 422 and 424. As indicated in Figure 12, these arms are offset from the rotor so as to engage respectively a pair of armatures in the form of iron pins 426 and 428 projecting from the core 410, for purposes hereinafter set forth, when the rotor moves to breaker-opening position as illustrated in Diagram C. When the rotor is in its normal or breaker-closing position (Diagram D), the arm 422 engages a stationary armature 430 mounted on, but magnetically separated from, the core 410. The words "engage" and "engagement," as applied to the arms 422 and 424 and the armatures 426, 428 and 430 in this specification and the claims, are intended to include actual contact or sufficient proximity for a substantial magnetic attraction between the elements. A spring 431, conventionally shown, tends to hold the rotor in its normal position perpendicular to the median line between the pole portions 412 and 414, as shown in Diagram D. As long as the potential coil 416 is energized, the armature 430 also tends to hold the rotor in its normal position in the same manner that the armature 60 holds the member 61 (Figure 1), a considerable force being required to rotate the rotor to breaker-opening position. This obviates undesirable sensitivity in the control portion of the apparatus. The potential coil 416 is normally connected across the feeder wires through a thermostatic switch element 432, a contact point 434 normally in contact therewith, a connecting wire 436, and a return wire 438.

The arm 422, which is mounted on the rotor, actuates an operating member 440 which opens and closes two switches 442 and 444 alternately. As indicated, when the rotor is in the position shown in Diagram C, the switch 442 is open and the switch 444 is closed. When the rotor is in the position shown in Diagram D, the switch 442 is closed and the switch 444 is open.

For the operation of the circuit breaker 406 any suitable mechanism may be employed such, for example, as that illustrated in Figure 1 or the mechanism illustrated in Figure 11. The latter comprises a pair of toggle arms 450 with a spring 452 to operate the toggle to open the breaker and a solenoid 454 to operate the toggle to close the breaker. When the breaker is closed, it is held in such position by a latch 456 which is arranged to be tripped by a coil 458 to permit the spring 452 to open the breaker if the closing coil 454 is deenergized.

In addition to the switches 434, 442 and 444, the apparatus includes a thermostatic switch 460 consisting of a pair of contact points bridged by a conductor 462 which is carried by but insulated from the thermostatic element 432; and also a pair of switches 464 and 466 which are alternately closed by a pallet 468 mounted on the breaker 406 in such a way that, when the breaker opens, the switch 464 opens and the switch 466 closes. When the breaker closes, the 464 closes and the switch 466 opens, the thermostatic element 432, which controls the switches 434 and 460, is heated by a heating coil 470 when current flows through this coil.

Under normal conditions in the feeder, the various parts of the apparatus are as shown in Diagram D. The current coil 408 is energized and the potential coil 416 is also energized, being connected across the feeder wires through the closed switch 434. The interaction of the fluxes of these coils is such as to hold the arm 422 against the stop 430. The heater coil 470 is connected to the normally open switch 444 and is therefore not energized. The trip coil 458 is in series with the open switch 444, the pallet switch 464, and the thermostatic switch 434. The closing coil 454 is in series with the switch 442, the thermostatic switch 460 and the open pallet switch 466. Thus the current coil 408 and the potential coil 416 are normally energized, while the closing coil 454, the trip coil 458 and the heater coil 470 are normally deenergized.

When a reverse power flow of sufficient magnitude occurs in the feeder, the rotor is rotated through an angle of less than 90° to the position shown in Diagram C, opening the switch 442 and closing the switch 444. This closes the circuit through the trip coil 458 which withdraws the latch 456 and permits the spring 452 to open the breaker 406. When the breaker opens, the switch 464 also opens, deenergizing the trip coil 458. At the same time, the switch 466 is closed, this switch being in series with the closed thermostatic switch 460, the open switch 442 and the breaker-closing coil 454.

When the switch 444 closes, a circuit through the heating coil 470 is also closed, and the coil starts to warm up the thermostat element 432. Meanwhile, if the feeder continues to be energized, the potential coil is also energized and the arms 422 and 424 are held magnetically against the pins 426 and 428, the spring 431 being preferably too weak to overcome by itself this magnetic attraction. After a predetermined period of time, depending on the characteristics and adjustment of the thermostatic device, the switches 434 and 460 open. The opening of the switch 434 results in the breaking of the circuit through the potential coil 416, destroying the flux in the arms 422 and 424 so that the rotor is swung back to its normal position by the spring 431, closing the switch 442 and opening the switch 444. The closing of the switch 442 is ineffective at the moment because the switch 460, in series with it, has been opened. The opening of the switch 444 cuts off the current through the heating coil 470 which thereupon starts to cool, causing the element 432 to swing back to normal position so as to close the switches 434 and 460. The latter completes the circuit through the breaker-closing coil 454, causing the breaker 406 to be closed. All of the parts of the apparatus are thereupon in the position shown in Diagram D. If, while the breaker has been open, the conditions causing the reverse flow of current in the feeder have been corrected, the breaker will remain closed. If not, the breaker will immediately reopen and another interval, depending on the action of the thermostatic element 432, will follow before the breaker is again closed.

The current coil 408 has negligible impedance whereas the potential coil has a large impedance. Under abnormal conditions which usually accompany a strong reverse flow of power in the feeder, phase relations between voltage and current will approximate those illustrated in Figure 13 and hereinbefore described. Under normal conditions, that is, when voltage in the feeder is normal and approximately in step with the current, the interaction between the rotor 418 and the core of the current coil 408 will be comparatively inefficient owing to the lag in the potential coil, but this is unimportant since the high voltage is ample to ensure proper operation of the mechanism. However, when energy conditions arise involving low voltage and low power factor in the feeder, the efficiency of the relay mechanism greatly increases, thus resulting in quick and positive operation of the relay in spite of adverse conditions. Moreover, short-circuit conditions in the supply circuit result in a large reverse current as well as a low voltage. This strongly magnetizes the current coil core 412, 414, so that all that the feeble current in the potential coil need do is to disturb the balance of the rotor by rotating it slightly. The strongly magnetized poles 412 and 414 then induce magnetic poles in the core 418, strongly reinforcing the poles resulting from the current in the potential coil 416 and ensuring quick and powerful actuation of the relay switch member 440.

It is evident that various further modifications and changes can be made in the embodiments of the invention herein illustrated and described without departing from the spirit or scope thereof, as defined in the following claims.

I claim:

1. In combination, an electric supply circuit, a load circuit, a circuit breaker between said circuits, an automatic control means for controlling said breaker including a latch adapted to retain said breaker releasably in closed position, a closing circuit containing a switch and an electromagnet energizable to close said breaker, and a power-directional device connected to said supply circuit, said device comprising a member movable between extreme positions in one of which it closes said switch and in the other of which it trips said latch, said member being arranged to tend toward an intermediate position, an electromagnet carried by said member, and a fixed electromagnet cooperating therewith, said electromagnets of the power-directional device having respectively a current coil and a potential coil permanently connected to the supply circuit, the coils and reciprocable member being arranged so that the energization of said coils by reverse power flow of predetermined magnitude in the supply circuit moves said member to its latch-tripping position, and energization of said potential coil when the circuit breaker is open and the feeder circuit is energized tends to move said member to switch-closing position.

2. In combination, two electric power circuits, a circuit breaker for connecting said circuits, means for controlling the opening and closing of said breaker, said means including a power-directional device having a member movable to breaker-opening and breaker-closing positions, said means also including means for maintaining said movable member in its opening position, said maintaining means comprising a holding coil connected across and normally energized by one of said circuits, and means connected in series with said coil for de-energizing said coil after a predetermined period of delay following the opening of said breaker.

3. In combination, two electric power circuits, a circuit breaker for connecting said circuits, means for controlling the opening and closing of said breaker, said means including a power-directional device having a member movable to breaker-opening and breaker-closing positions, said means also including means for maintaining said movable member in its opening position, said maintaining means comprisng an electromagnet connected across and normally energized by one of said circuits, a thermostatic switch in series with said magnet, a heating coil for the operation of said switch connected in series therewith, and a second switch in series with said thermostatic switch and heating coil, said second switch being closed by the opening of said breaker.

4. In combination, two electric power circuits, a circuit breaker for connecting said circuits, means for controlling the opening and closing of said breaker, said means including a power-directional device having a member movable to breaker-opening and breaker-closing positions, said means also including means energized by one of said circuits for maintaining said movable member in its opening position, and means for automatically deenergizing said energized means after a predetermined interval following the conditioning of said directional device to open said breaker.

5. In combination, two electric circuits, a circuit breaker for connecting said circuits, means for controlling the opening and closing of said breaker, said means including a power-directional device having a member movable between a breaker-opening position and breaker-closing position and means for maintaining said member in breaker-closing position as long as power flow between said circuits is in normal direction or is less than a substantial predetermined maximum in reverse direction and for moving said member to breaker-opening position when reverse flow of energy between said circuits exceeds said maximum, said controlling means also including means energized by one of said circuits to hold said member in its opening position and for automatically releasing said member after a predetermined interval.

6. In a polyphase alternating current system, a supply circuit, a load circuit, a transformer having a primary circuit connected to said supply circuit and a secondary circuit connected to said load circuit, a circuit breaker between the transformer and said load circuit, means including a power-directional device for controlling the opening and closing of said breaker in accordance with power conditions in the secondary circuit of said transformer, and means for preventing breaker-closing operation of said control means when the phase sequence in said secondary circuit is opposite to the phase sequence in said load circuit, all said means being entirely disconnected from said load circuit when said breaker is open.

7. In a network protector including a circuit breaker in a feeder connecting a polyphase power supply circuit and a load circuit, means including a movable member for controlling the opening and closing of said breaker in accordance with power conditions in the feeder, and means for preventing breaker-closing operation of said control means when the phase sequence in the feeder is reversed, said preventing means including an armature carried by said movable member, and reactance units star-connected to the lines of the feeder, one of said reactance units being an electromagnetic coil in operative proximity to said armature.

8. In a polyphase alternating current system of distribution, a power circuit, a network, a plurality of feeders connecting said power circuit to said network for supply of power thereto, a breaker in each said feeder, power directional means for controlling the opening of each said breaker, means including a movable member for controlling the closing of each said breaker, and means for preventing breaker-closing operation of each of the latter controlling means when the phase sequence in the corresponding feeder is reversed, each of said preventing means being responsive only to voltage phase conditions in its feeder, and each said preventing means including impedance units star-connected to the lines of the corresponding feeder, one of said units being an electromagnet coil, and an armature carried by said movable member in operative relation to said coil.

9. In an alternating current distribution system comprising a supply circuit, a load circuit and a breaker connecting said circuits, a reverse power mechanism including a current coil, a potential coil, said coils each having a core arranged for direct interaction between the fluxes of said cores, one said core being movable relatively to the other, means controlled at least in part by motion of said movable core to open and close said breaker, and a fixed armature of magnetic material adapted to be engaged by said movable core when in breaker-closing position.

10. In an alternating current distribution system comprising a supply circuit, a load circuit and a breaker connecting said circuits, a reverse power mechanism including a fixed current coil having a core, a potential coil having a core and movable by direct interaction of the magnetic fluxes of said coils in one direction or the other according to the direction of power flow between said circuits, means controlled at least in part by the movements of said potential coil and core to open and close said breaker, and a fixed armature engaged by the core of said potential coil when in breaker-closing position.

11. In a network protective mechanism including a stationary current coil, a movable potential coil, cores for said coils, and means controlled at least in part by movements of said potential coil for opening and closing a circuit breaker, a fixed stop element of magnetic material engageable by said movable core when in breaker-opening position and a second fixed stop element of magnetic material engageable by said movable core when in breaker-closing position, whereby each of said stop elements is magnetized by said movable core when in engagement therewith so as to exert a substantial magnetic attractive force thereon, and means exerting a mechanical force on said movable core tending to move it toward breaker-closing position.

12. In an alternating current distribution system comprising a supply circuit, a load circuit and a feeder containing a breaker connecting said circuits, a reverse power protective mechanism including a stationary current coil and a movable potential coil connected to said feeder and having cores arranged for direct interaction between the fluxes of said coils whereby the potential coil tends to move in one direction or the other according to the direction of power flow in said feeder, means controlled at least in part by movements of said potential coil to open and close said breaker, a fixed armature of magnetic material engageable by said movable core when in breaker-opening position, and means for automatically deenergizing said potential coil after a predetermined interval following breaker-opening movement thereof.

13. In an alternating current distribution system comprising a supply circuit, a load circuit, and a feeder containing a breaker connecting said circuits, a reverse power protective mechanism including a stationary current coil, a potential coil movable in opposite directions between breaker-opening and breaker-closing positions, breaker-operating means controlled at least in part by movement of said potential coil, said coils being arranged so that their fluxes interact to tend to move the potential coil in one direction or the other according to the direction of power flow in the feeder, a U-shaped core extending through said current coil, a core extending through said potential coil and movable therewith between the arms of said U-shaped core, a stop element of magnetic material engageable by said movable core when in breaker-closing position, a second stop element of magnetic material mounted on an arm of said U-shaped core and engageable by said movable core when in breaker-opening position, mechanical means tending to move said potential coil and core to breaker-closing position, and means made operative when the breaker is opened to deenergize the potential coil after a predetermined time interval.

14. In an alternating current distribution system comprising a supply circuit, a load circuit, and a feeder containing a breaker connecting said circuits, a reverse power protective mechanism including a stationary current coil connected to said feeder on the supply side of said breaker, a movable potential coil connected to said feeder on the load side of the breaker, said coils being arranged for direct interaction between their fluxes to tend to move said potential coil in one direction or another according to the direction of power flow in said feeder, and means controlled at least in part by movements of said potential coil for opening and closing said breaker.

15. In an alternating current distribution system comprising a supply circuit, a load circuit, and a feeder containing a breaker connecting said circuits, a reverse power protective mechanism including a stationary current coil connected to said feeder on the supply side of said breaker, a movable potential coil connected to said feeder on the load side of the breaker, said coils being arranged for direct interaction between their fluxes to tend to move said potential coil in one direction or another according to the direction of power flow in said feeder, and means responsive to movements of said potential coil to open and close the breaker, mechanical means tending to move said potential coil toward its breaker-closing position, a pair of fixed stop elements magnetizable respectively by said potential coil when in one or the other of its positions to exert a substantial retaining force on said potential coil, and means for automatically deenergizing said potential coil after a predetermined time interval following any opening of the breaker.

16. In combination, a supply circuit, a load circuit, a feeder normally connecting said circuits, a breaker in said feeder, a latch normally holding said breaker in closed position, a power directional device for controlling said breaker, said device including a movable member having a potential coil mounted thereon and a stationary current coil, said coils being normally energized from the supply side of said breaker and relatively arranged so that interaction of the magnetic fluxes therein from a reverse power flow in the feeder moves the movable member in a direction to trip the latch and energization of the potential coil moves the movable member to breaker-closing position, and means for temporarily retaining said movable member in latch-tripping position and releasing said movable member after a predetermined time interval.

WILLIAM R. BULLARD.